(12) United States Patent
Furuskog et al.

(10) Patent No.: US 10,484,076 B2
(45) Date of Patent: Nov. 19, 2019

(54) METHODS, NETWORK NODE AND WIRELESS TERMINAL FOR BEAM TRACKING WHEN BEAMFORMING IS EMPLOYED

(71) Applicant: Telefonaktiebolaget LM Ericsson (publ), Stockholm (SE)

(72) Inventors: Johan Furuskog, Stockholm (SE); Håkan Andersson, Linköping (SE); Mattias Frenne, Uppsala (SE); Johan Kåredal, Lund (SE); John Skördeman, Brokind (SE); Tomas Sundin, Sollentuna (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/759,876

(22) PCT Filed: Feb. 6, 2018

(86) PCT No.: PCT/SE2018/050103
§ 371 (c)(1),
(2) Date: Mar. 14, 2018

(87) PCT Pub. No.: WO2018/174769
PCT Pub. Date: Sep. 27, 2018

(65) Prior Publication Data
US 2019/0052341 A1 Feb. 14, 2019

Related U.S. Application Data

(60) Provisional application No. 62/474,635, filed on Mar. 22, 2017.

(51) Int. Cl.
*H04B 7/08* (2006.01)
*H04B 17/318* (2015.01)
(Continued)

(52) U.S. Cl.
CPC .......... *H04B 7/088* (2013.01); *H04B 7/0617* (2013.01); *H04B 17/318* (2015.01); *H04W 16/28* (2013.01)

(58) Field of Classification Search
CPC .... H04B 7/088; H04B 17/318; H04B 7/0617; H04B 7/0695; H04W 16/28
See application file for complete search history.

(56) References Cited

U.S. PATENT DOCUMENTS

| 9,900,891 | B1* | 2/2018 | Islam | H04W 36/0055 |
| 2017/0237477 | A1* | 8/2017 | Fujio | H04B 7/06 370/329 |
| 2018/0091262 | A1* | 3/2018 | Jung | H04L 1/06 |

* cited by examiner

*Primary Examiner* — Janice N Tieu
(74) *Attorney, Agent, or Firm* — Murphy, Bilak & Homiller, PLLC (57) ABSTRACT

A network node (100), a wireless terminal (102) and methods therein, for supporting beam tracking in the wireless terminal (102) when a selected network beam ($B_c$) and a selected terminal beam ($T_c$) are used. The network node (100) identifies a set of candidate network beams (B) having spatial characteristics similar to the selected network beam ($B_c$), and signals the candidate network beams to the wireless terminal (102). When the network node (100) transmits beam reference signals in the candidate network beams using beam sweeping, the wireless terminal (102) measures received power using different candidate terminal beams (T) and estimates received power of combinations of beam reference signal and candidate terminal beam that have not been measured, based on the measured combinations of beam reference signal and candidate terminal beam.

28 Claims, 5 Drawing Sheets

(51) Int. Cl.
*H04B 7/06* (2006.01)
*H04W 16/28* (2009.01)

Network beam sweeping

Fig. 1A

Bc = current selected network beam
Tc = current selected terminal beam

|    | B1 | B2 | B3  | B4 | B5 | B6 | B7 | B8 | B9 |
|----|----|----|-----|----|----|----|----|----|----|
| T1 |    |    | -90 |    |    |    |    |    |    |
| T2 |    |    | -83 |    |    |    |    |    |    |
| T3 |    |    | -78 |    |    |    |    |    |    |
| T4 |    |    | -81 |    |    |    |    |    |    |
| T5 |    |    | -93 |    |    |    |    |    |    |

Fig. 5

|    | B1   | B2  | B3  | B4  | B5   | B6   | B7   | B8   | B9   |
|----|------|-----|-----|-----|------|------|------|------|------|
| T1 | -104 |     |     |     | -100 |      |      |      | -187 |
| T2 | -97  | -89 | -83 | -86 | -93  | -105 | -120 | -140 | -180 |
| T3 |      | -84 | X   |     | -100 |      |      |      |      |
| T4 |      |     | -81 |     |      |      | -118 |      |      |
| T5 |      |     |     | -96 |      |      |      | -150 |      |

METHODS, NETWORK NODE AND WIRELESS TERMINAL FOR BEAM TRACKING WHEN BEAMFORMING IS EMPLOYED

TECHNICAL FIELD

The present disclosure relates generally to a network node, a wireless terminal and methods therein, for supporting or performing beam tracking when beamforming is employed in radio communication between the wireless terminal and the network node.

BACKGROUND

In this disclosure, the term "wireless terminal" is used to represent any communication entity capable of radio communication with a wireless network by sending and receiving radio signals. For example, the wireless terminal described herein may be any of a mobile telephone, a tablet, a laptop computer and a Machine-to-Machine, M2M, device, also known as Machine Type Communication, MTC, device. Another common generic term in this field is "User Equipment, UE" which may be used herein as a synonym for wireless terminal.

Further, the term "network node", is used herein to represent any node of a wireless network, which node is operative to transmit radio signals in multiple spatially differentiated beams, known as beamforming, in radio communication with wireless terminals. The network node in this disclosure may refer to a base station, radio node, Node B, base transceiver station, access point, etc., which communicates radio signals with the wireless terminal.

Beamforming is likely to become an important technology in future radio communication systems and wireless networks. It can be used to improve performance in a wireless network, by increasing the received signal strength, thereby improving the radio coverage in the network, and also by reducing unwanted interference, thereby improving the capacity of the network. Beamforming can be applied both in a signal transmitting node, referred to as a transmitter, and a signal receiving node, referred to as a receiver. In a transmitter, beamforming amounts to configuring the transmitter to transmit the signal in a specific direction (or a few directions), referred to as a transmit beam, and not in other directions. In a receiver, beamforming amounts to configuring the receiver to only receive signals from a certain direction (or a few directions), and not from other directions, referred to as a receive beam. When beamforming is applied in both the transmitter and the receiver for a given communication link, the term beam-pair link (BPL) is commonly used for the combination of beams selected in the both ends, i.e. including the above-mentioned transmit beam and receive beam. A BPL can also be referred to as a beam-tracking process (BTP) since it may be subject to different procedures for its maintenance.

In a radio communication of signals transmitted from a network node and received by a wireless terminal, a selected network beam and a selected terminal beam are used. Throughout this disclosure, the term "selected" implies that the beams are used for communicating data and/or messages between network node and the wireless terminal. During the communication, the available network beams and terminal beams are evaluated based on signal measurements and if there is another combination of network beam and terminal beam which is better than the currently used combination, the new combination is used instead. The above evaluation can be performed by the wireless terminal when the network node transmits certain reference signals on different network beams, by measuring received power of a beam reference signal using different candidate terminal beams. This process is referred to as beam tracking.

However, the above-described beam tracking and signal measurements is a slow process and in the meantime the measurements may become outdated so that the selection of beam(s) based on those measurements may not be optimal.

SUMMARY

It is an object of embodiments described herein to address at least some of the problems and issues outlined above. It is possible to achieve this object and others by using a network node, a wireless terminal and methods therein, as defined in the attached independent claims.

According to one aspect, a method is performed by a network node for supporting beam tracking in a wireless terminal when beamforming is employed in radio communication between the wireless terminal and the network node using a current selected network beam and a current selected terminal beam. In this method, the network node identifies a set of candidate network beams having spatial characteristics similar to the current selected network beam, wherein a beam reference signal is associated with each candidate network beam in the set of candidate network beams.

The network node then signals to the wireless terminal identities of the beam reference signals associated with the set of candidate network beams, or signals to the wireless terminal identities of the candidate network beams. The network node also transmits the beam reference signals in the set of candidate network beams using beam sweeping where at least some of the beam reference signals are transmitted separately multiple times. Thereby, the wireless terminal is enabled to measure received power of the beam reference signals using different candidate terminal beams.

According to another aspect, a network node is arranged to support beam tracking in a wireless terminal when beamforming is employed in radio communication between the wireless terminal and the network node using a current selected network beam and a current selected terminal beam. The network node is configured to identify a set of candidate network beams having spatial characteristics similar to the current selected network beam, wherein a beam reference signal is associated with each candidate network beam in the set of candidate network beams. The network node is also configured to signal to the wireless terminal identities of the beam reference signals associated with the set of candidate network beams, or to signal to the wireless terminal identities of the candidate network beams.

The network node is further configured to transmit the beam reference signals in the set of candidate network beams using beam sweeping where at least some of the beam reference signals are transmitted separately multiple times, thereby enabling the wireless terminal to measure received power of the beam reference signals using different candidate terminal beams.

According to another aspect, a method is performed by a wireless terminal for beam tracking when beamforming is employed in radio communication between the wireless terminal and a network node using a current selected network beam and a current selected terminal beam. In this method, the wireless terminal receives from the network node identities of beam reference signals associated with a set of candidate network beams or identities of the candidate network beams.

The wireless terminal further measures received power of said beam reference signals using different candidate terminal beams, and estimates received power of combinations of beam reference signal and candidate terminal beam that have not been measured, based on the measured combinations of beam reference signal and candidate terminal beam.

According to another aspect, a wireless terminal is arranged to perform beam tracking when beamforming is employed in radio communication between the wireless terminal and a network node using a current selected network beam and a current selected terminal beam. The wireless terminal is configured to receive from the network node identities of beam reference signals associated with a set of candidate network beams, or to receive from the network node identities of the candidate network beams. The wireless terminal is also configured to measure received power of said beam reference signals using different candidate terminal beams.

The wireless terminal is further configured to estimate received power of combinations of beam reference signal and candidate terminal beam that have not been measured, based on the measured combinations of beam reference signal and candidate terminal beam.

The above methods, network node and wireless terminal may be configured and implemented according to different optional embodiments to accomplish further features and benefits, to be described below.

A computer program is also provided comprising instructions which, when executed on at least one computer in either of the network node and the wireless terminal, cause the at least one computer to carry out the respective methods described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

First, the process of beam tracking will be described in more detail.

Generally, the beamforming gains are related to the widths of the used beams: a relatively narrow beam provides more gain than a wider beam, in the reception of radio signals transmitted between two nodes such as a wireless terminal and a network node.

For a more general description of beamforming, it is typically referred to beamforming weights rather than beams. On the transmission side, the beamforming weights are defined by complex constants that the signals to be transmitted are multiplied with before being distributed to the individual antenna elements. There is a separate beamforming weight for each antenna element, which allows maximum freedom in shaping the transmission beam given the fixed antenna array. Correspondingly, on the receiving side, the received signal from each antenna element is multiplied separately with the beamforming weights before the signals are combined. However, the present description is easier to follow if the somewhat simplified notion of beams, pointing in certain physical directions, is adopted.

Beamforming requires some form of beam management, such as beam search, beam refinement, and/or beam tracking, to determine what transmit and receive beams (directions) to use for communication between two nodes such as a wireless terminal and a network node. Network nodes can transmit periodic or continuous reference signals that are semi-statically configured to support mobility and beam management, e.g. by sweeping across several transmit beams as described above. Such transmissions are here referred to as Beam Reference Signals (BRS). It may be assumed that some aspects of beam management can be performed by a wireless terminal with little or no explicit involvement from the network, if the terminal can assume that the network is transmitting the BRS periodically or continuously from a network node.

Beam tracking is applied when a BPL is already present where a selected network beam and a selected terminal beam are used in an ongoing communication, to update the selected beams when the conditions change, e.g., due to mobility. Beam tracking is typically performed by temporarily evaluating a different beam than the one selected in the BPL, and switching to that beam if it is deemed better than the currently used beam. In case of downlink communication, a network beam may be referred to as a transmit beam and a terminal beam may be referred to as a receive beam, while for uplink communication the terminal beam is used as a transmit beam and the network beam is used as a receive beam. In transmit beam tracking, different transmit beams are evaluated while keeping the receive beam unchanged, after which the best evaluated transmit beam is selected for communication.

Correspondingly, receive beam tracking evaluates different receive beams while keeping the transmit beam unchanged, and then selecting the best receive beam.

Figure 1A:
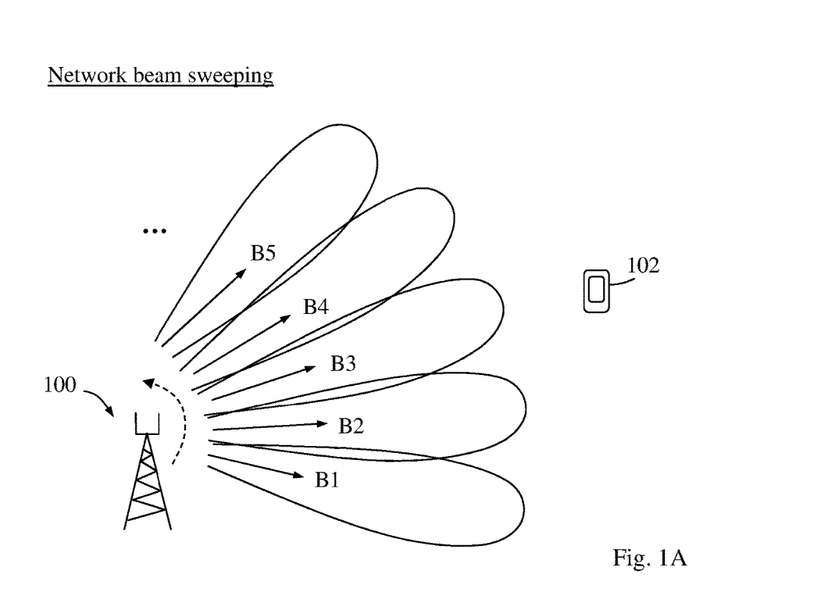
FIG. 1A is a network scenario illustrating network beam sweeping which could be used in the solution.

FIG. 1A illustrates that a network node 100 transmits BRSs in a succession of spatially differentiated network/transmit beams B1, B2, B3, B4, B5 . . . , using beam sweeping, which enables a wireless terminal 102 to measure received power of the BRS in each beam. The beam sequence is repeated at regular intervals. It should be noted that the beam sequence used by the network node for transmitting BRSs is not necessarily the straight sequence starting from the lowest beam number B1 and continuing with B2, B3, B4, B5 . . . , as shown in FIG. 1A, and the BRSs may be transmitted in any other beam sequence such as a reverse order starting from the highest beam number, or in a more irregular order, e.g. B3, B5, B1, B4, B2 . . . , to mention some non-limiting but illustrative examples.

Throughout this description, the term "beam sweeping" may thus refer to any predefined sequence or order of beams.

Generally, the best receive beam may be different depending on which transmit beam is currently used, and vice versa. This may particularly be the case when network beams are transmitted from multiple different transmission points: from the perspective of a wireless terminal, these transmission points may transmit in different directions, requiring different terminal beams. In the presence of reflections, even network beams transmitted from the same transmission point may require different terminal beams. Thus, terminal beam tracking is typically performed by evaluating different terminal beams using the currently selected network beam.

In systems or procedures where a network node periodically transmits BRSs, the wireless terminal can perform receive beam tracking for a BPL by measuring the BRS when it is transmitted with the selected network beam, each time using a different terminal beam. Whenever such a BRS measurement is stronger than the last BRS measured with the currently selected terminal beam of the BPL, the terminal beam in the BPL is updated with the beam used for obtaining the stronger measurement. In this description, the term "stronger" is used to indicate that a measured received power of a BRS is higher than a measured received power of another BRS.

Figure 1B:
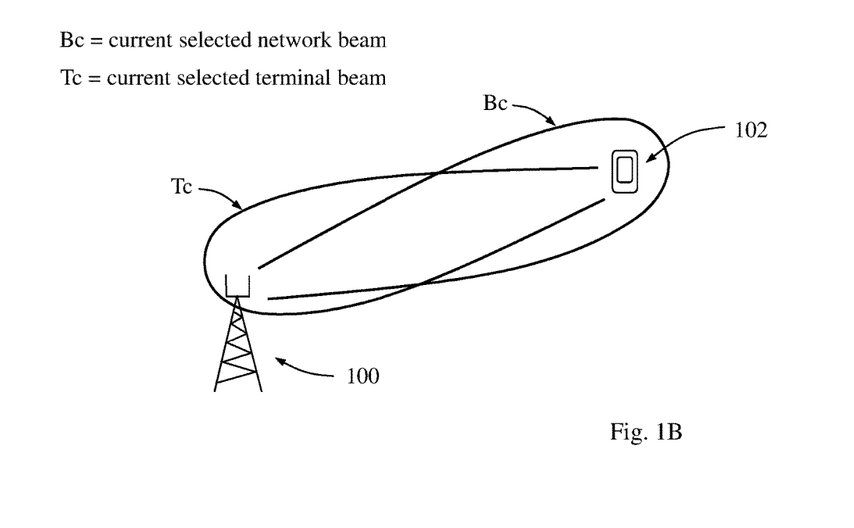
FIG. 1B is a communication scenario illustrating how a selected network beam and a selected terminal beam can be employed in a radio communication where the solution could be used.

To formalize the above reasoning, RP(B,T) can denote the measured received power of BRS "B" using terminal beam "T", $B_c$ can denote the BRS of the selected network beam which is currently used, and $T_c$ can denote the selected terminal beam which is currently used. Generally, if $RP(B_c, T_2) > RP(B_c, T_c)$ for some terminal beam $T_2$, then the wireless terminal selects $T_2$ as the terminal beam to use. FIG. 1B illustrates a radio communication between the wireless terminal 102 and the network node 100 using a current selected network beam $B_c$ and a current selected terminal beam $T_c$, which beams are thus used for communicating data and/or messages between the wireless terminal 102 and the network node 100.

Problems with Existing Procedures

As mentioned above, when BRS signals are transmitted in many network beams using beam sweeping, any individual BRS is typically transmitted rather infrequently, i.e. seldom, resulting in a slow terminal beam tracking process, particularly when only that BRS is used for beam tracking. If multiple network beams are to be evaluated as well, the time it takes to measure all beam combinations will be even greater.

Hence, the above-described customary beam tracking procedure typically takes a substantial amount of time to complete, e.g. when the received power of each available network beam is measured for all available terminal beams, particularly since each individual network beam is transmitted infrequently. It is therefore a problem that beam tracking is a slow process when all potential combinations of transmit or network beam and receive or terminal beam are to be measured and the radio conditions may also change rapidly such that the measurements will be outdated and misleading, i.e. useless, before all possibilities have been measured and evaluated. The performance can thus be deteriorated by selecting network beam and/or terminal beam based on outdated measurements.

In examples and embodiments described herein, the wireless terminal measures on a limited selection of BRSs transmitted with network beams that have similar spatial characteristics as the currently selected network beam, over time using different terminal beams, and uses the measurement results to improve terminal beam tracking. If such a BRS B1 is received stronger with terminal beam T1 than with terminal beam T2, the terminal concludes that T1 is better than T2 even if BRS B1 is not the strongest BRS or transmitted using the currently selected network beam. The network node informs the terminal about which BRS have such similar spatial characteristics. Such spatial characteristics may include network beams being transmitted from the same location, i.e. transmission point. By allowing a larger set of network beams to be used for terminal beam tracking, terminal beam tracking can be faster and more accurate, without using more network resources.

Figure 2:
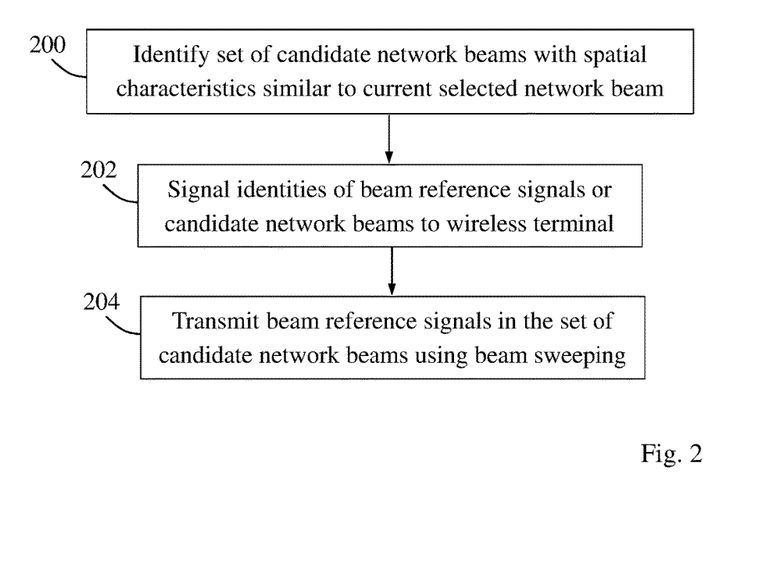
FIG. 2 is a flow chart illustrating a procedure in a network node, according to some possible embodiments.

An example of how the solution may be employed in terms of actions performed by a network node such as the network node 100, is illustrated by the flow chart in FIG. 2 which will now be described with further reference to FIG. 1B. FIG. 2 thus illustrates a procedure in the network node 100 for supporting beam tracking in a wireless terminal 102 when beamforming is employed in radio communication between the wireless terminal 102 and the network node 100 using a current selected network beam $B_c$ and a current selected terminal beam $T_c$, as illustrated in FIG. 1B. Some optional example embodiments that could be used in this procedure will also be described.

A first action 200 illustrates that the network node 100 identifies a set of candidate network beams B having spatial characteristics similar to the current selected network beam $B_c$, wherein a beam reference signal is associated with each candidate network beam in the set of candidate network beams B. It may be assumed that such network beams with similar spatial characteristics are likely to provide better signal reception than other network beams with non-similar spatial characteristics. In another action 202, the network node 100 further signals to the wireless terminal 102 identities of the beam reference signals associated with the set of candidate network beams B or identities of the candidate network beams.

In another action 204, the network node 100 transmits the beam reference signals in the set of candidate network beams B using beam sweeping where at least some of the beam reference signals are transmitted separately multiple times. Thereby, the wireless terminal 102 is enabled to measure received power of the beam reference signals one by one, using different candidate terminal beams T, e.g. in order to identify which combination of terminal beam and network beam provides the best or at least acceptable reception.

In one example embodiment, the set of candidate network beams B may be identified as transmitted from the same transmission point as the selected network beam $B_c$. In this context "the same transmission point" may imply the same antenna(s) or one or more antennas located within a certain small maximum distance from the one(s) currently used.

In another example embodiment, the set of candidate network beams B may be identified as being sufficiently strong for the wireless terminal 102. This means that a signal transmitted in any of the candidate network beams B should be received by the wireless terminal 102 with sufficient signal strength so that the signal can be properly detected and measured.

In another example embodiment, the set of candidate network beams B may be identified as transmitted in similar directions as the selected network beam $B_c$. This means basically that only network beams that have a direction which is deemed to be more or less "close" to the selected network beam $B_c$ may be included in the set of candidate network beams B. In other words, those network beams that have a direction which is substantially different from the currently used network beam $B_c$ are omitted in the set of candidate network beams B since they are likely to provide poorer reception than network beams transmitted in similar directions.

In another example embodiment, the set of candidate network beams B may be identified by using a machine-learning algorithm to determine groups of network beams that generally have the same best terminal beam. For example, some network beams may often reach terminals in a given area using a direct (line-of-sight) wave, from the same direction towards terminals, while some other network beams may often reach terminals in the same area via a reflection, e.g. against a wall, and thus be received from another direction towards the terminals. Based on analysis of measurements reports, the network can identify these similarities over time and learn to associate these beams in groups that are identified to the terminal as often having the same best terminal beam.

Figure 3:
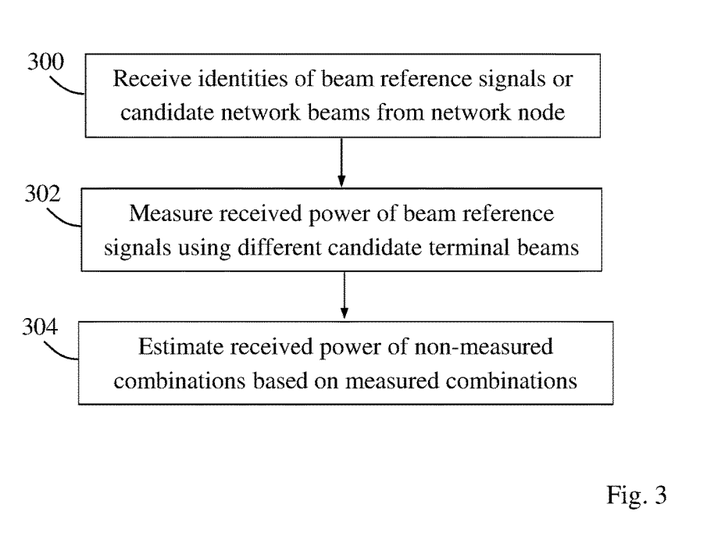
FIG. 3 is a flow chart illustrating a procedure in a wireless terminal, according to further possible embodiments.

Another example of how the solution may be employed in terms of actions performed by a wireless terminal such as the wireless terminal 102, is further illustrated by the flow chart in FIG. 3 which will now be described likewise with further reference to FIG. 1B. FIG. 3 thus illustrates a procedure in the wireless terminal 102 for beam tracking when beamforming is employed in radio communication between the wireless terminal 102 and a network node 100 using a current selected network beam $B_c$ and a current selected terminal beam $T_c$. Some optional example embodiments that could be used in this procedure will also be described.

A first action 300 illustrates that the wireless terminal 102 receives from the network node 100 identities of beam reference signals associated with a set of candidate network beams B or identities of the candidate network beams. This action corresponds to action 202.

A further action 302 illustrates that the wireless terminal 102 measures received power of said beam reference signals using different candidate terminal beams T. This action is performed basically when the network node 100 performs action 204. An example of how this action may be performed in practice will be described later below with reference to FIG. 4.

In another action 304, the wireless terminal 102 estimates received power of combinations of beam reference signal and candidate terminal beam T that have not been measured, based on the measured combinations of beam reference signal and candidate terminal beam T. Some examples of how this action may be performed in practice will be described later below with reference to the table in FIG. 6.

Some further examples of how the solution may be employed in practice will now be described, although the solution is not necessarily limited to these examples.

In one example embodiment, the wireless terminal 102 may measure each beam reference signal for the current selected terminal beam $T_c$, and may further measure at least one beam reference signal associated with a candidate network beam B for each candidate terminal beam in the set of candidate terminal beams T. A practical example of how this embodiment may be used will be described later below with reference to FIG. 4.

Some example embodiments will now be described, of how the wireless terminal may estimate or calculate received power of a non-measured combination of beam reference signal B and candidate terminal beam, based on measured combinations of beam reference signal and candidate terminal beam, which is performed in action 304 above.

In another example embodiment, the wireless terminal may estimate received power RP(B,T) of a non-measured combination of a first beam reference signal B and a first candidate terminal beam T, by using a measured received power $RP(B_c,T)$ of a second beam reference signal $B_c$ in the first candidate terminal beam T and applying an offset based on a relation between a measured received power $RP(B,T_o)$ of the first beam reference signal B in a second candidate terminal beam $T_o$, and a measured received power $RP(B_c, T_o)$ of the second beam reference signal $B_c$ in the second candidate terminal beam $T_o$.

In another example embodiment when the latter embodiment is employed, said relation may be the difference between the measured received powers $RP(B,T_o)$, $RP(B_c, T_o)$ in decibels. Alternatively, said relation may be the ratio between the measured received powers $RP(B,T_o)$, $RP(B_c, T_o)$ in linear.

In another example embodiment, the wireless terminal may estimate received power RP(B,T) of a non-measured combination of a first beam reference signal B and a first candidate terminal beam T, by using a measured received power $RP(B,T_o)$ of the first beam reference signal B in a second candidate terminal beam $T_o$, and applying an offset based on a relation between a measured received power $RP(B_c,T)$ of a second beam reference signal $B_c$ in the first candidate terminal beam T, and a measured received power $RP(B_c,T_o)$ of the second beam reference signal $B_c$ in the second candidate terminal beam $T_o$.

In another example embodiment when the latter embodiment above is employed, said relation may be the difference between the measured received powers $RP(B_c,T)$, $RP(B_c, T_o)$ in decibels. Alternatively, said relation may be the ratio between the measured received powers $RP(B_c,T)$, $RP(B_c, T_o)$ in linear.

In another example embodiment, the wireless terminal 102 may estimate received power RP(B,T) of a non-measured combination of a first beam reference signal B and a first candidate terminal beam T, as $$RP(B,T)=RP(B_c,T)+RP(B,T_o)-RP(B_c,T_o), \text{ where}$$

$RP(B_c,T)$ is a measured received power of a second beam reference signal $B_c$ in the first candidate terminal beam T, $RP(B,T_o)$ is a measured received power of the first beam reference signal B in a second candidate terminal beam $T_o$, and $RP(B_c,T_o)$ is a measured received power of the second beam reference signal $B_c$ in the second candidate terminal beam $T_o$.

In another example embodiment, the wireless terminal 102 may select a new combination of network beam B and terminal beam T for use in the radio communication or for further evaluation, corresponding to a combination of beam reference signal and candidate terminal beam T that has a measured or estimated received power that is higher than the currently used combination of network beam $B_c$ and terminal beam $T_c$.

Further non-limiting details, features and characteristics of the above-described actions and embodiments, will now be outlined. However, the solution is not necessarily limited to these examples either.

Network beams transmitted from the same transmission point often share many characteristics. This is particularly true in scenarios such as line-of-sight (LOS) or near-LOS, or scenarios with a relatively small amount of signal reflections. In this case, several network beams can be useful for beam tracking performed by the wireless terminal. This can speed up the beam tracking when used with periodic reference signals such as BRS, since there are in total more measurement opportunities during a given time.

Signaling BRS to the Terminal to Use for Beam Tracking

One feature of the embodiments herein is that the network node informs the wireless terminal which BRSs, or network beams, can be used for beam tracking, as of actions 202 and 300 above. In prior procedures, this may only be the BRS of the selected network beam currently in use, but the embodiments herein may involve the possibility for the network node to indicate a number of BRSs for this purpose, particularly those with spatial characteristics similar to the current selected network beam. The network node may choose to include all BRSs transmitted from the same transmission point. Alternatively, it may choose to indicate only those BRSs that are deemed to provide sufficiently strong received power for the terminal, or only those BRSs that are transmitted in similar directions as the selected network beam. Another alternative is to use a machine-learning algorithm to determine groups of network beams that generally have the same best terminal beam. These alternatives have been described above as example embodiments and they may be used separately or in any combination, and the solution is not limited in this respect.

Performing Beam Tracking Using Multiple BRSs

Another feature of the embodiments herein is that the wireless terminal can perform beam tracking using multiple BRS:s. BRS measurements of RP(B,T) may be available for multiple BRS:s B and terminal beams T. As previously described, $B_c$ may denote the BRS of the selected network beam, and $T_c$ may denote the selected terminal beam. In the following, only BRS:s B that are appropriate for beam tracking will be considered, e.g. those BRSs that have been indicated as such by the network node as of action 202.

In one possible implementation, the wireless terminal measures BRS in the selected network beam $B_c$ using all or at least a set of candidate terminal beams, thus obtaining RP($B_c$,T) for all T, and additionally performs at least one more BRS measurement for each terminal beam T, using some other BRS B, thus for each T obtaining RP(B,T) for some B. The wireless terminal then uses these measurement results to estimate RP(B,T) for pairs (B,T) for which it does not yet have a measurement, referred to as "non-measured combinations of BRS and candidate terminal beam".

Such estimates can be used by the wireless terminal directly in the process of terminal beam tracking, i.e. to select the best terminal beam, or at least a useful terminal beam. Alternatively, the estimates can be used to suggest or trigger new measurements to either confirm or disqualify the estimates. For instance, if such estimates indicate that RP($B_c$,T) is strongest for a terminal beam T=$T_1$, but no measurement is available for RP($B_c$,$T_1$), the wireless terminal can wait until next transmission of BRS $B_c$ and then measure RP($B_c$,$T_1$), thereby confirming that estimate before selecting $T_1$ as the terminal beam.

A basic rule that may be applied is that if RP(B,$T_1$)>RP(B,$T_2$), then it is likely that RP($B_c$,$T_1$)>RP($B_c$,$T_2$). In other words, if one terminal beam is better than another terminal beam when measuring one BRS, the same will be true when measuring BRS in the selected network beam. Thus, if RP($B_c$,$T_2$) is the currently strongest measurement for the selected network beam $B_c$, the terminal should not select $T_2$ but rather $T_1$.

More generally, the terminal can model the received power to be approximately separable (additive) in B and T, meaning that RP(B,T)=f(B)+g(T) for some unknown functions f and g. An estimate can then be obtained of any RP(B,T) based on measurements for other beam pairs as described above, using the formula RP($B_c$,T)+RP(B,$T_o$)−RP($B_c$,$T_o$), where $T_o$ is a terminal beam for which measurements have been made of BRS B.

To illustrate that this formula can be used in practice, the following may be considered:

$$RP(B_c,T)+RP(B,T_o)-RP(B_c,T_o)=f(B_c)+g(T)+f(B)+g(T_o)-(f(B_c)+g(T_o))=f(B)+g(T)=RP(B,T)$$

Figure 4:
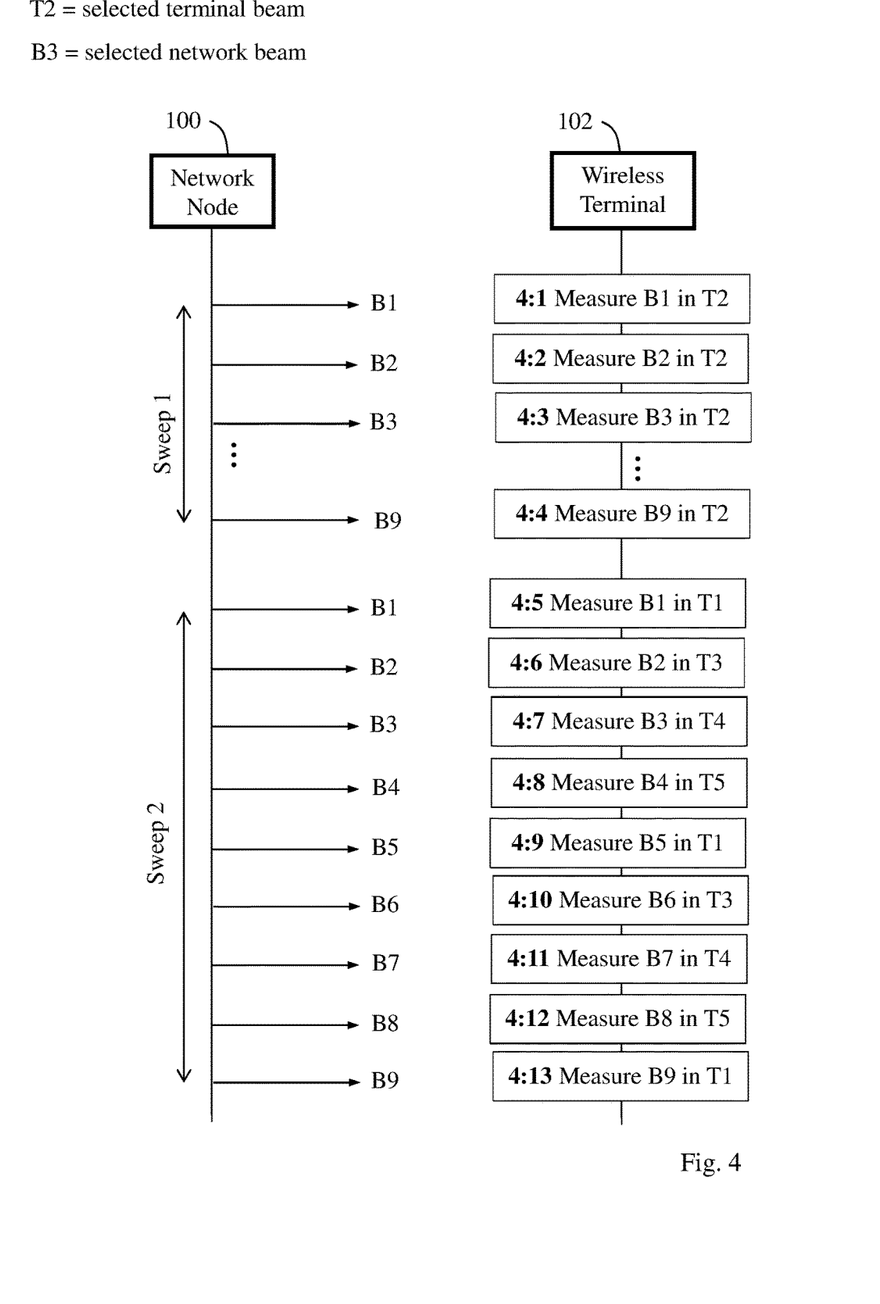
FIG. 4 is a communication diagram illustrating an example of how a wireless terminal may measure received power for a set of candidate network beams using different candidate terminal beams, according to further possible embodiments.
Figure 5:
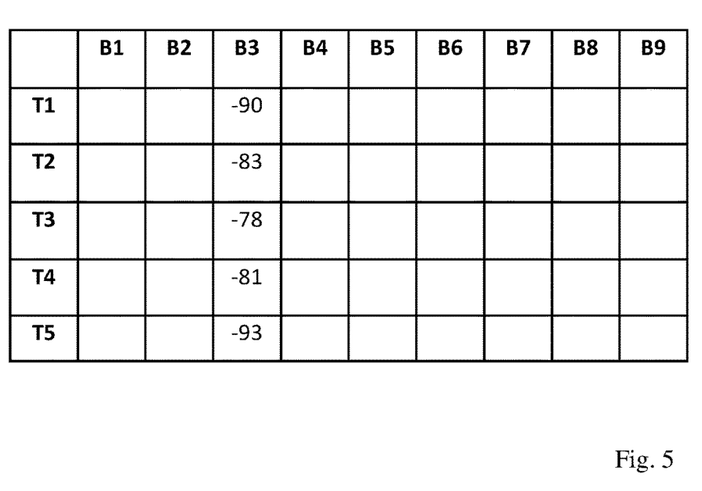
FIG. 5 is an example table with measurements results for one network beam using different candidate terminal beams.
Figure 6:
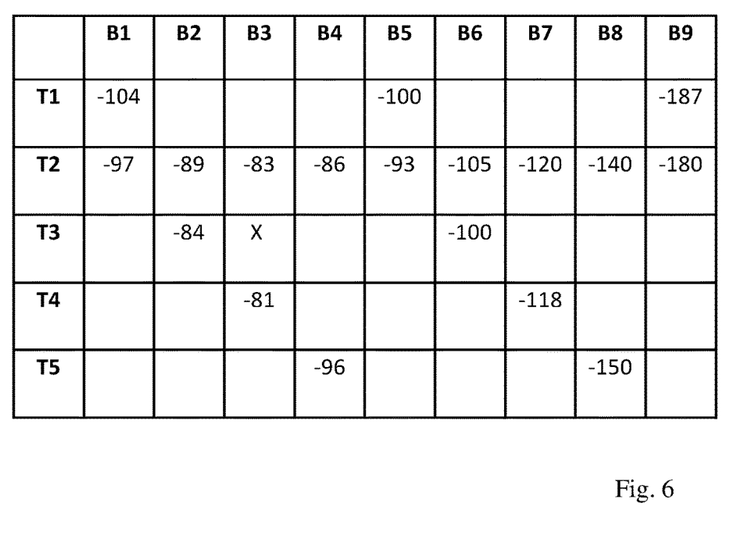
FIG. 6 is an example table with measurements results for a set of candidate network beams using a set of candidate terminal beams, according to further possible embodiments.

FIGS. 4-6 illustrate some non-limiting examples where at least some of the above-described embodiments are used while B3 is the currently selected network beam and T2 is the currently selected terminal beam.

It was mentioned above that the wireless terminal 102 may measure each BRS for the current selected terminal beam $T_c$, and may further measure at least one BRS associated with a candidate network beam B for each candidate terminal beam in the set of candidate terminal beams T. FIG. 4 illustrates an example of how the wireless terminal 102 may operate in this case when having received identities of BRSs associated with a set of candidate network beams B1-B9 or identities of the candidate network beams B1-B9 themselves, depending on the implementation. Reception of these identities have been described above for action 300. In either case, the wireless terminal 102 is able to detect the BRSs and measure their received power when transmitted from the network node 100.

In FIG. 4, the network node 100 transmits the BRSs in the candidate network beams B1-B9 one by one, thus using beam sweeping such that the same sequence of network beams B1-B9 is repeated multiple times, indicated as Sweep 1, Sweep 2, and so forth. The transmission of beam reference signals in the candidate network beams has been described above for action 204.

Hence, when the network node 100 transmits a BRS in network beam B1, the wireless terminal 102 measures B1 in the currently used, i.e. selected, terminal beam T2, in an action 4:1. When the network node 100 transmits a BRS in network beam B2, the wireless terminal 102 measures B2 in T2, in an action 4:2. When the network node 100 transmits a BRS in network beam B3, the wireless terminal 102 measures B3 in T2, in an action 4:3, and so forth until all candidate network beams B1-B9 have been measured in T2. It is shown that the wireless terminal 102 measures the last B9 in T2, in an action 4:4. This type of measurement is thus repeated for all candidate network beams B1-B9 which can be done in a single sweep 1. Thereby, the wireless terminal 102 has measured BRSs in all candidate network beams B1-B9 for the current selected terminal beam T2.

Then in a subsequent sweep 2, when the network node 100 once again transmits the BRSs in network beams B1-B9 one by one, the wireless terminal 102 performs measurements as follows.

The wireless terminal 102 measures B1 in a candidate terminal beam T1, in an action 4:5. The wireless terminal 102 measures B2 in a candidate terminal beam T3, in an action 4:6. The wireless terminal 102 measures B3 in a candidate terminal beam T4, in an action 4:7. The wireless terminal 102 measures B4 in a candidate terminal beam T5, in an action 4:8. Thereby, all candidate terminal beam T1-T5 have been measured once using network beams B1-B4. The wireless terminal 102 then continues to measure further network beams B5-B9 in different candidate terminal beams as follows.

The wireless terminal 102 measures B5 in terminal beam T1, in an action 4:9. The wireless terminal 102 measures B6 in terminal beam T3, in an action 4:10. The wireless terminal 102 measures B7 in terminal beam T4, in an action 4:11. The wireless terminal 102 measures B8 in terminal beam T5, in an action 4:12. Finally, the wireless terminal 102 measures B9 in terminal beam T1, in an action 4:13. These measurements are displayed in the table of FIG. 6, to be described below. Thereby, the wireless terminal 102 has measured at least one BRS for each candidate terminal beam T1-T5.

The table in FIG. 5 illustrates an example showing BRS measurements of received power for BRS in the selected network beam B3 using a set of candidate terminal beams T1-T5 which may comprise all available terminal beams. T3 has the highest RP(B,T) so the wireless terminal should select T3 if it has that knowledge, i.e., if it has done measurements of B3 using all candidate terminal beams T. However, this can take a long time since B3 may be transmitted infrequently. T2 is thus the currently selected beam, but since T3 provides stronger received power for B3, the beam tracking function in the terminal should select T3 instead. It should be noted, however, that obtaining these five measurements can take considerable time if a conventional procedure for beam tracking is employed, since the BRS B3 may be transmitted relatively infrequently, and it is typically only possible to measure with one terminal beam each time a particular BRS is transmitted. It may thus be a risk that the measurement(s) made a long time ago, i.e. at the beginning of the procedure, have become outdated and are therefore no longer valid and useful for evaluation.

The table in FIG. 6 illustrates an example showing BRS measurements made by a wireless terminal implementing the procedure described above for FIG. 4, when B3 is the selected network beam and T2 is the selected terminal beam. All BRS:s associated with individual network beams in a set of candidate network beams are measured using the selected terminal beam T2, as described above for actions 4:1-4:4, which can be done in a single sweep. Further, each BRS is measured using at least one terminal beam in addition to the selected T2, as described above for actions 4:5-4:13 which can be done in another single sweep. Hence, it takes only two sweeps to generate the measurements depicted in FIG. 6.

This allows the wireless terminal to estimate the received power of any BRS using any terminal beam, using relatively few measurements which increases the chances that the measurements are still valid for evaluation. FIG. 6 shows one way the wireless terminal can perform faster measurements and still get estimates of all RP(B,T), as described above. In this example, an estimate of RP(B3,T3), denoted "X" in the table, can be obtained as X=RP(B3,T2)+RP(B2,T3)−RP(B2,T2)=−83+(−84)−(−89)=−78. In this table, received powers are in dBm, so negative values correspond to received power levels below 1 mW. A similar calculation can be done for other non-measured beam pairs until all RP(B,T) have been determined, such that the beam pairs can be evaluated and the best combination be selected. It should be noted that such calculations can be made considerably faster than the time it takes to wait for opportunities to actually measure each individual beam pair.

Figure 7:
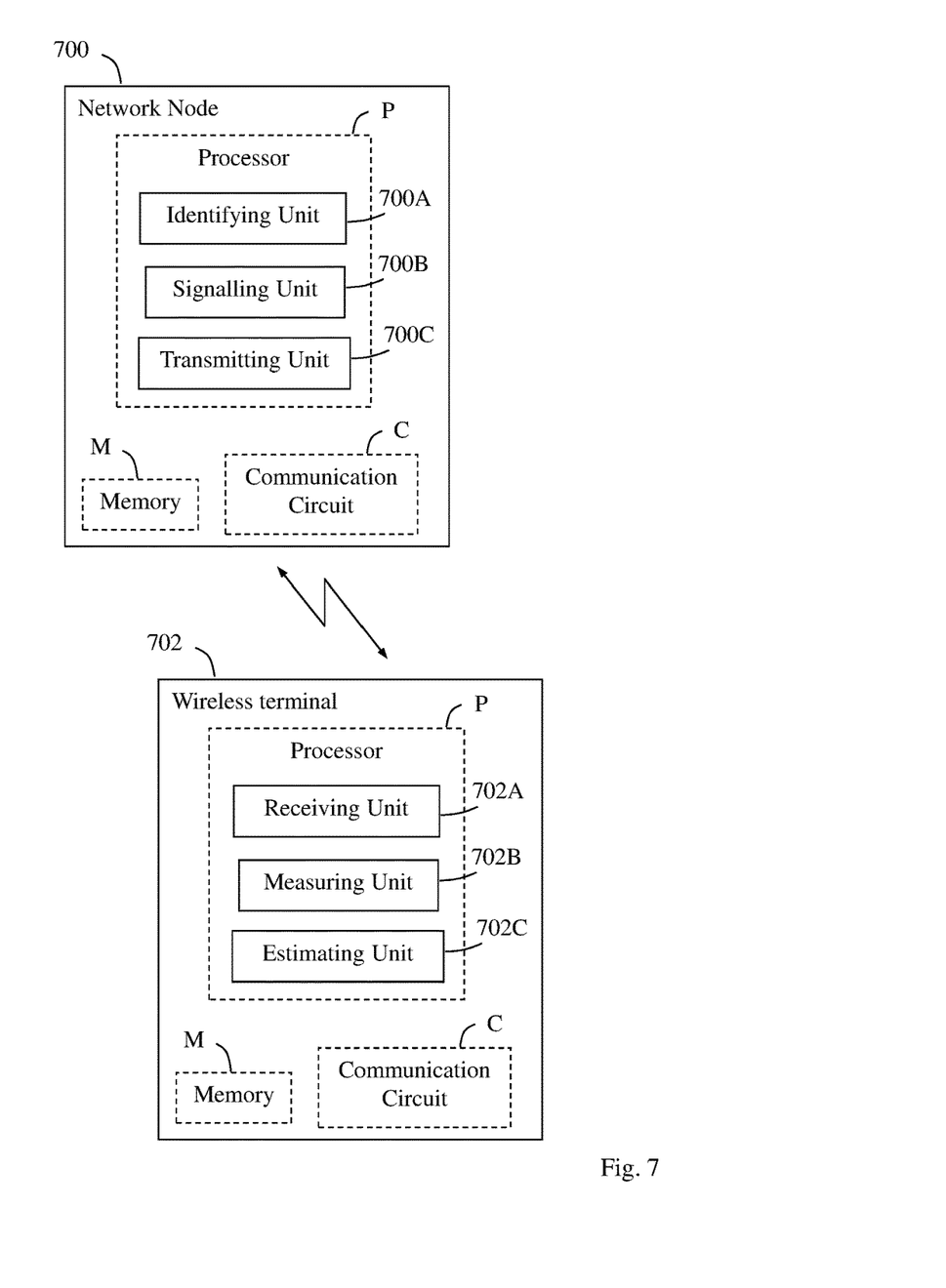
FIG. 7 is a block diagram illustrating a network node and a wireless terminal in more detail, according to further possible embodiments.

The block diagram in FIG. 7 illustrates a detailed but non-limiting example of how a network node 700 and a wireless terminal 702, respectively, may be structured to bring about the above-described solution and embodiments thereof. In this figure, the network node 700 and the wireless terminal 702 may be configured to operate according to any of the examples and embodiments of employing the solution as described herein, where appropriate. Each of the network node 700 and the wireless terminal 702 is shown to comprise a processor "P", a memory "M" and a communication circuit "C" with suitable equipment for transmitting and receiving radio signals in the manner described herein.

The communication circuit C in each of the network node 700 and the wireless terminal 702 thus comprises equipment configured for communication with each other using a suitable protocol for the communication depending on the implementation. The solution is however not limited to any specific types of radio signals, messages or protocols.

The network node 700 is, e.g. by means of units, modules or the like, configured or arranged to perform the actions of the flow chart in FIG. 2 and as follows. Further, the wireless terminal 702 is, e.g. by means of units, modules or the like, configured or arranged to perform the actions of the flow chart in FIG. 3 and as follows.

The network node 700 is arranged to support beam tracking in a wireless terminal 702 when beamforming is employed in radio communication between the wireless terminal 702 and the network node 700 using a current selected network beam $B_c$ and a current selected terminal beam $T_c$. As explained above, "current selected" implies that the beams can be used for communicating data and messages between the wireless terminal 702 and the network node 700.

The network node 700 is configured to identify a set of candidate network beams B having spatial characteristics similar to the current selected network beam $B_c$, wherein a beam reference signal is associated with each candidate network beam in the set of candidate network beams B. This operation may be performed by an identifying unit 700A in the network node 700, as illustrated in action 200. The identifying unit 700A could alternatively be named a logic unit or selecting unit.

The network node 700 is also configured to signal to the wireless terminal 702 identities of the beam reference signals associated with the set of candidate network beams B or identities of the candidate network beams. This operation may be performed by a signalling unit 700B in the network node 700, as illustrated in action 202. The signalling unit 700B could alternatively be named an instructing unit.

The network node 700 is also configured to transmit the beam reference signals in the set of candidate network beams B using beam sweeping where at least some of the beam reference signals are transmitted separately multiple times. This operation may be performed by a transmitting unit 700C in the network node 700, as illustrated in action 204. Thereby, the wireless terminal 702 is enabled to measure received power of the beam reference signals using different candidate terminal beams T.

The wireless terminal 702 is arranged to perform beam tracking when beamforming is employed in radio communication between the wireless terminal 702 and a network node 700 using a current selected network beam $B_c$ and a current selected terminal beam $T_c$.

The wireless terminal 702 is configured to receive from the network node 700 identities of beam reference signals associated with a set of candidate network beams B. This operation may be performed by a receiving unit 702A in the wireless terminal 702 as illustrated in action 300.

The wireless terminal 702 is also configured to measure received power of said beam reference signals using different candidate terminal beams T. This operation may be performed by a measuring unit 702B in the wireless terminal 702, as illustrated in action 302. The measuring unit 702B could alternatively be named a detecting unit or determining unit.

The wireless terminal 702 is further configured to estimate received power of combinations of beam reference signal and candidate terminal beam T that have not been measured, based on the measured combinations of beam reference signal and candidate terminal beam T. This operation may be performed by an estimating unit 702C in the wireless terminal 702, as illustrated in action 304. The estimating unit 702C could alternatively be named a calculating unit or computing unit.

It should be noted that FIG. 7 illustrates various functional units in the network node 700 and the wireless terminal 702, respectively, and the skilled person is able to implement these functional units in practice using suitable software and hardware equipment. Thus, the solution is generally not limited to the shown structures of the network node 700 and the wireless terminal 702, and the functional units therein may be configured to operate according to any of the features, examples and embodiments described in this disclosure, where appropriate.

The functional units 700A-C and 702A-C described above may be implemented in the network node 700 and the wireless terminal 702, respectively, by means of program modules of a respective computer program comprising code means which, when run by the processor P causes the network node 700 and the wireless terminal 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 700 and the wireless terminal 702 in the form of a memory having a computer readable medium and being connected to the processor P. The computer program product or memory M in each of the network node 700 and the wireless terminal 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 700 and wireless terminal 702.

The solution described herein may be implemented in each of the network node 700 and the wireless terminal 702 by a computer program comprising instructions which, when executed on at least one processor, cause the at least one processor to carry out the actions according to any of the above embodiments and examples, where appropriate. The solution may also be implemented at each of the network node 700 and the wireless terminal 702 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless terminal", "network beam", "terminal beam", "beam reference signal" and "machine-learning algorithm" have been used throughout this disclosure, although any other corresponding entities, functions, and/or parameters could also be used having the features and characteristics described here. The solution may be implemented according to the appended embodiments.

The invention claimed is:

1. A method performed by a network node for supporting beam tracking in a wireless terminal when beamforming is employed in radio communication between the wireless terminal and the network node using a current selected network beam ($B_c$) and a current selected terminal beam ($T_c$), the method comprising:
   identifying a set of candidate network beams (B) having spatial characteristics similar to the current selected network beam ($B_c$), wherein a beam reference signal is associated with each candidate network beam in the set of candidate network beams (B);
   signalling to the wireless terminal identities of the beam reference signals associated with the set of candidate network beams (B) or identities of the candidate network beams; and
   transmitting the beam reference signals in the set of candidate network beams (B) using beam sweeping where at least some of the beam reference signals are transmitted separately multiple times, thereby enabling the wireless terminal to measure received power of the beam reference signals using different candidate terminal beams (T).

2. A method according to claim 1, wherein the set of candidate network beams (B) is identified as transmitted from the same transmission point as the selected network beam ($B_c$).

3. A method according to claim 1, wherein the set of candidate network beams (B) is identified as being sufficiently strong for reception by the wireless terminal.

4. A method according to claim 1, wherein the set of candidate network beams (B) is identified as transmitted in similar directions as the selected network beam ($B_c$).

5. A method according to claim 1, wherein the set of candidate network beams (B) is identified by using a machine-learning algorithm to determine groups of network beams that generally have the same best terminal beam.

6. A network node arranged to support beam tracking in a wireless terminal when beamforming is employed in radio communication between the wireless terminal and the network node using a current selected network beam (Bc) and a current selected terminal beam ($T_c$), wherein the network node comprises:
   a communication circuit;
   at least one processor operatively coupled to the communication circuit; and
   at least one memory storing computer-executable instructions that, when executed by the
      at least one processor, configure the network node to:
      identify a set of candidate network beams (B) having spatial characteristics similar to the current selected network beam ($B_c$), wherein a beam reference signal is associated with each candidate network beam in the set of candidate network beams (B);
      signal to the wireless terminal identities of the beam reference signals associated with the set of candidate network beams (B) or identities of the candidate network beams; and
      transmit the beam reference signals in the set of candidate network beams (B) using beam sweeping where at least some of the beam reference signals are transmitted separately multiple times, thereby enabling the wireless terminal to measure received power of the beam reference signals using different candidate terminal beams (T).

7. A network node according to claim 6, wherein execution of the instructions further configures the network node to identify the set of candidate network beams (B) as transmitted from the same transmission point as the selected network beam ($B_c$).

8. A network node according to claim 6, wherein execution of the instructions further configures the network node to identify the set of candidate network beams (B) as being sufficiently strong for reception by the wireless terminal.

9. A network node according to claim 6, wherein execution of the instructions further configures the network node to identify the set of candidate network beams (B) as transmitted in similar directions as the selected network beam ($B_c$).

10. A network node according to claim 6, wherein execution of the instructions further configures the network node to identify the set of candidate network beams (B) by using a machine-learning algorithm to determine groups of network beams that generally have the same best terminal beam.

11. A method performed by a wireless terminal for beam tracking when beamforming is employed in radio communication between the wireless terminal and a network node using a current selected network beam ($B_c$) and a current selected terminal beam ($T_c$), the method comprising:
receiving from the network node identities of beam reference signals associated with a set of candidate network beams (B) or identities of the candidate network beams;
measuring received power of said beam reference signals using different candidate terminal beams (T); and
estimating received power of combinations of beam reference signal and candidate terminal beam (T) that have not been measured, based on the measured combinations of beam reference signal and candidate terminal beam (T).

12. A method according to claim 11, wherein measuring received power comprises:
measuring each beam reference signal for the current selected terminal beam ($T_c$); and
measuring at least one beam reference signal associated with a candidate network beam (B) for each candidate terminal beam in the set of candidate terminal beams (T).

13. A method according to claim 12, wherein estimating received power of combinations comprises estimating received power RP(B,T) of a non-measured combination of a first beam reference signal (B) and a first candidate terminal beam (T), by using a measured received power $RP(B_c,T)$ of a second beam reference signal ($B_c$) in the first candidate terminal beam (T) and applying an offset based on a relation between a measured received power $RP(B,T_o)$ of the first beam reference signal (B) in a second candidate terminal beam ($T_o$), and a measured received power $RP(B_c,T_o)$ of the second beam reference signal ($B_c$) in the second candidate terminal beam ($T_o$).

14. A method according to claim 13, wherein said relation is the difference between the measured received powers $RP(B,T_o)$, $RP(B_c,T_o)$ in decibels, or said relation is the ratio between the measured received powers $RP(B,T_o)$, $RP(B_c,T_o)$ in linear.

15. A method according to claim 12, estimating received power of combinations comprises estimating received power RP(B,T) of a non-measured combination of a first beam reference signal (B) and a first candidate terminal beam (T), by using a measured received power $RP(B,T_o)$ of the first beam reference signal (B) in a second candidate terminal beam ($T_o$), and applying an offset based on a relation between a measured received power $RP(B_c,T)$ of a second beam reference signal ($B_c$) in the first candidate terminal beam (T), and a measured received power $RP(B_c,T_o)$ of the second beam reference signal ($B_c$) in the second candidate terminal beam ($T_o$).

16. A method according to claim 15, wherein said relation is the difference between the measured received powers $RP(B_c,T)$, $RP(B_c,T_o)$ in decibels, or said relation is the ratio between the measured received powers $RP(B_c,T)$, $RP(B_c,T_o)$ in linear.

17. A method according to claim 12, wherein estimating received power of combinations comprises estimating received power RP(B,T) of a non-measured combination of a first beam reference signal (B) and a first candidate terminal beam (T), as $RP(B,T) = RP(B_c,T) + RP(B,T_o) - RP(B_c,T_o)$, where:
$RP(B_c,T)$ is a measured received power of a second beam reference signal ($B_c$) in the first candidate terminal beam (T);
$RP(B,T_o)$ is a measured received power of the first beam reference signal (B) in a second candidate terminal beam ($T_o$); and
$RP(B_c,T_o)$ is a measured received power of the second beam reference signal ($B_c$) in the second candidate terminal beam ($T_o$).

18. A method according to claim 11, further comprising selecting a new combination of network beam (B) and terminal beam (T) for use in the radio communication or for further evaluation, the new combination corresponding to a combination of beam reference signal and candidate terminal beam (T) that has a measured or estimated received power that is higher than the currently used combination of network beam ($B_c$) and terminal beam ($T_c$).

19. A wireless terminal arranged to perform beam tracking when beamforming is employed in radio communication between the wireless terminal and a network node using a current selected network beam ($B_c$) and a current selected terminal beam ($T_c$), wherein the wireless terminal comprises:
a communication circuit;
at least one processor operatively coupled to the communication circuit; and
at least one memory storing computer-executable instructions that, when executed by the
at least one processor, configure the wireless terminal to:
receive from the network node identities of beam reference signals associated with a set of candidate network beams (B) or identities of the candidate network beams;
measure received power of said beam reference signals using different candidate terminal beams (T); and
estimate received power of combinations of beam reference signal and candidate terminal beam (T) that have not been measured, based on the measured combinations of beam reference signal and candidate terminal beam (T).

20. A wireless terminal according to claim 19, wherein execution of the instructions further configures the wireless terminal to:
measure each beam reference signal for the current selected terminal beam ($T_c$); and measure at least one beam reference signal associated with a candidate network beam (B) for each candidate terminal beam in the set of candidate terminal beams (T).

21. A wireless terminal according to claim 20, wherein execution of the instructions further configures the wireless terminal to estimate received power RP(B,T) of a non-measured combination of a first beam reference signal (B) and a first candidate terminal beam (T), by using a measured received power $RP(B_c,T)$ of a second beam reference signal ($B_c$) in the first candidate terminal beam (T) and by applying an offset based on a relation between a measured received power $RP(B,T_o)$ of the first beam reference signal (B) in a second candidate terminal beam ($T_o$) and a measured received power $RP(B_c,T_o)$ of the second beam reference signal ($B_c$) in the second candidate terminal beam ($T_o$).

22. A wireless terminal according to claim 21, wherein said relation is the difference between the measured received powers $RP(B,T_o)$, $RP(B_c,T_o)$ in decibels, or said relation is the ratio between the measured received powers $RP(B,T_o)$, $RP(B_c,T_o)$ in linear.

23. A wireless terminal according to claim 20, wherein execution of the instructions further configures the wireless terminal to estimate received power RP(B,T) of a non-measured combination of a first beam reference signal (B) and a first candidate terminal beam (T), by using a measured received power $RP(B,T_o)$ of the first beam reference signal (B) in a second candidate terminal beam ($T_o$), and by applying an offset based on a relation between a measured received power $RP(B_c,T)$ of a second beam reference signal ($B_c$) in the first candidate terminal beam (T) and a measured received power $RP(B_c,T_o)$ of the second beam reference signal ($B_c$) in the second candidate terminal beam ($T_o$).

24. A wireless terminal according to claim 23, wherein said relation is the difference between the measured received powers $RP(B_c,T)$, $RP(B_c,T_o)$ in decibels, or said relation is the ratio between the measured received powers $RP(B_c,T)$, $RP(B_c,T_o)$ in linear.

25. A wireless terminal according to claim 20, wherein execution of the instructions further configures the wireless terminal to estimate received power RP(B,T) of a non-measured combination of a first beam reference signal (B) and a first candidate terminal beam (T), as $RP(B,T) = RP(B_c,T) + RP(B,T_o) - RP(B_c,T_o)$, where:

$RP(B_c,T)$ is a measured received power of a second beam reference signal ($B_c$) in the first candidate terminal beam (T), $RP(B,T_o)$ is a measured received power of the first beam reference signal (B) in a second candidate terminal beam ($T_o$), and $RP(B_c,T_o)$ is a measured received power of the second beam reference signal ($B_c$) in the second candidate terminal beam ($T_o$).

26. A wireless terminal according to claim 19, wherein execution of the instructions further configures the wireless terminal to select a new combination of network beam (B) and terminal beam (T) for use in the radio communication or for further evaluation, corresponding to a combination of beam reference signal and candidate terminal beam (T) that has a measured or estimated received power that is higher than the currently used combination of network beam ($B_c$) and terminal beam ($T_c$).

27. A non-transitory, computer-readable medium comprising computer-executable instructions that, when executed on at least one processor comprising a network node, cause the network node to carry out operations corresponding to the method of claim 1.

28. A non-transitory, computer-readable medium comprising computer-executable instructions that, when executed on at least one processor comprising a wireless terminal, cause the wireless terminal to carry out operations corresponding to the method of claim 11.

* * * * *